United States Patent
Kipping et al.

(10) Patent No.: US 8,061,748 B2
(45) Date of Patent: Nov. 22, 2011

(54) SYSTEM FOR HANDLING COMPONENTS HAVING SIMILAR SHAPES BY USING TWO GRIPPER JAWS COUPLED TO A COMMON DISPLACEMENT DRIVE

(75) Inventors: Tino Kipping, Schmelz (DE); Josef Kipping, Schmelz (DE); Ulrich Knapp, Neunkirchen (DE)

(73) Assignee: ThyssenKrupp Drauz Nothelfer GmbH, Heilbronn (GB)

( * ) Notice: Subject to any disclaimer, the term of this patent is extended or adjusted under 35 U.S.C. 154(b) by 727 days.

(21) Appl. No.: 12/083,476

(22) PCT Filed: Oct. 10, 2006

(86) PCT No.: PCT/EP2006/067246
§ 371 (c)(1),
(2), (4) Date: Jul. 31, 2008

(87) PCT Pub. No.: WO2007/042518
PCT Pub. Date: Apr. 19, 2007

(65) Prior Publication Data
US 2008/0296920 A1      Dec. 4, 2008

(30) Foreign Application Priority Data

Oct. 13, 2005 (DE) .......................... 10 2005 049 494
Jun. 2, 2006 (DE) .......................... 10 2006 025 844

(51) Int. Cl.
*B25J 15/00* (2006.01)

(52) U.S. Cl. ............................ 294/88; 294/106; 901/31

(58) Field of Classification Search .................. 294/115, 294/88, 106, 901, 902; 901/30, 31, 32, 36, 901/37; 269/27, 32, 34
See application file for complete search history.

(56) References Cited

U.S. PATENT DOCUMENTS

| 4,565,400 | A | * | 1/1986 | Nakashima et al. | ............. 294/88 |
| 4,627,158 | A | | 12/1986 | Mitoh | ............... 29/771 |
| 6,428,071 | B2 | | 8/2002 | Bertini | ...................... 294/119.1 |
| 7,396,059 | B2 | * | 7/2008 | Maffeis | ........................ 294/88 |
| 2008/0073922 | A1 | * | 3/2008 | Holtz | ............... 294/88 |

FOREIGN PATENT DOCUMENTS

| DE | 195 18 062 | | 12/1995 |
| DE | 200 17 129 | | 2/2001 |
| DE | 202 19 713 | U1 | 2/2004 |
| EP | 0 115 544 | A1 | 9/1985 |

OTHER PUBLICATIONS

International Search Report for PCT/EP2006/067246.

* cited by examiner

*Primary Examiner* — Paul T Chin
(74) *Attorney, Agent, or Firm* — Crowell & Moring LLP (57) ABSTRACT

A handling for components having a similar shape, particularly motor vehicle body parts, wherein a gripper on an arm of a robot can grip the component and its similarly-shaped other components with one and the same clamp device without re-tooling, is equipped with two gripper chucks on each clamp device. However, only one gripper chuck can be steered into the grab positions in each case, while the other gripper chuck is then located in the parking position outside a grab area on the component.

11 Claims, 9 Drawing Sheets

SYSTEM FOR HANDLING COMPONENTS HAVING SIMILAR SHAPES BY USING TWO GRIPPER JAWS COUPLED TO A COMMON DISPLACEMENT DRIVE

CROSS-REFERENCE TO RELATED APPLICATIONS

This application is a National Phase Application of International Application No. PCT/EP2006/067246, filed on Oct. 10, 2006, which claims the benefit of and priority to German patent application no. DE 10 2005 049 494.3, filed Oct. 13, 2005, and German patent application no. DE 10 2006 025 844.4, filed Jun. 2, 2006. The disclosure of each of the above applications is incorporated herein by reference in their entirety.

FIELD OF THE INVENTION

The invention relates to a handling system for components having a similar shape, particularly motor vehicle body parts, in which a gripper on the arm of a robot is equipped with several clamp devices having contour pieces adapted to the components, with which the respective component can be gripped on areas spatially staggered to one another.

BACKGROUND

In motor vehicle body construction known handling systems (DE 202 19 713 U1) are used, wherein the component to be handled, for example a motor vehicle door, is gripped by means of a gripper on the arm of a robot and brought exactly to the place of the body structure, where it is to be assembled. So that the component is picked up securely and precisely, the gripper is equipped with several clamp devices, on their part each comprising a gripper chuck, which grip the component in several spatially staggered places with the contour pieces adapted to the component. A pre-condition for precise-position gripping requires that for each type of component the clamp devices on the gripper are positioned accordingly and equipped with suitable contour pieces. Such a device and change-over of the grippers are necessary even if components having a similar shape are to be handled. "Components having a similar shape" are understood to mean those, which although congruent in several places have a different height to each other. Alternatively a further suitably tooled handling system could also be used for another type of component, which however would be associated with a substantial increase in engineering costs.

For opening and closing gripper chucks of handling systems mechanical drives, which have a toothed push bar, are known (U.S. Pat. No. 6,428,071 B2). The driving toothed push bar is formed as part of a hydraulic cylinder piston arrangement and is coupled to the movable gripper jaws of the gripper chuck via a fixed pinion.

SUMMARY OF THE INVENTION

In general, in one aspect, the invention is to provide a handling system for components having a similar shape, particularly motor vehicle body parts, in which with one and the same gripper these components can be handled without laborious setting up and re-tooling.

In one embodiment, a handling system includes clamp devices, each clamp device having two gripper chucks, whose gripper jaws can be pivoted from a parking position into a grab position, the gripper jaws of the gripper chuck being in their parking position whenever the gripper jaws of the other gripper chuck are pivoted into their grab position and vice versa.

The invention is based on the realization that in the case of components having a similar shape there are places, which although cannot be gripped by the same gripper chuck with the same contour pieces, can be gripped by the other gripper chuck with other contour pieces. A pre-condition however is that gripping of the component by the one gripper chuck is not obstructed by the gripper jaws of the other gripper chuck, which lies in the way thus causing interference. According to the invention, this is accomplished by the alternate locking of the gripper chucks in the parking position lying outside the grab movement of the other gripper chuck.

In order to set up a gripper for the components having a similar shape, according to one embodiment of the invention, it is proposed that the clamp devices are held by support arms, adapted in length, of the gripper. By pivoting and longitudinal adjustment of the support arms each clamp device can be matched to the congruent areas of the components having a similar shape on which they are to be gripped. The pairs of gripper jaws of each clamp device are then equipped in each case with contour pieces suitable for the two components having a similar shape. Thus compensation for different heights can also be made.

Preferably, the gripper chucks of each clamp device respectively have a drive comprising toothed push bars. The toothed push bars of two gripper chucks, arranged adjacent to each other, of the same clamp device preferably can be alternately coupled to the same engaging pieces of the drive. The engaging piece itself is driven by a crank and rocker linkage mechanism. According to an alternative embodiment of the drive of the gripper chucks, the gripper jaws of the two gripper chucks can be pivotally and axially displaced on common bearing journals and, with drive pinions, can be coupled to a common driven toothed push bar.

The special advantages of this other drive lie in its simple construction, which manages with only one toothed push bar for both gripper chucks. A further advantage consists in the fact that the same operating position is provided for both gripper chucks.

In order to move the gripper jaws of the gripper chuck from their parking position into the operating position and the gripper jaws, located in the operating position, of the other gripper chuck into their parking position and vice versa, the gripper jaws are coupled to a common displacement drive. The displacement drive can have an actuator, displaceably mounted parallel to the bearing journals and driven by a servo motor, which is connected to the gripper jaws via engaging pieces. Preferably the servo motor is a cylinder piston arrangement, able to be impacted on both sides by a pressurizing medium and to whose piston rod the actuator is attached. The engaging pieces can be pins, which engage in coaxial annular grooves of the drive pinions of the gripper jaws.

Since the invention proposes the same operating position for both gripper chucks, the guidance of the now active gripper chuck and the locking of the inactive gripper chuck are simply constructed, by guidance flanks being provided on both sides for the gripper jaws of each active gripper chuck, whose drive pinions now exactly engage with the toothed push bar, said guide flanks being effective during the pivot movement of said gripper jaws, and by lateral holding pockets being provided for the gripper jaws of each then inactive gripper chuck, whose drive pinions do not then engage with the toothed push bar.

Since only one common toothed push bar is provided for both gripper chucks, the toothed push bar can be constantly coupled to the drive. According to one embodiment of the invention, it is propulsively connected to the piston rod of a cylinder piston arrangement via a pinion and an elbow lever coupled thereto.

BRIEF DESCRIPTION OF THE DRAWINGS

The invention is described in detail below with reference to a drawing illustrating two exemplary embodiments, wherein individually.

DESCRIPTION

Figure 1:
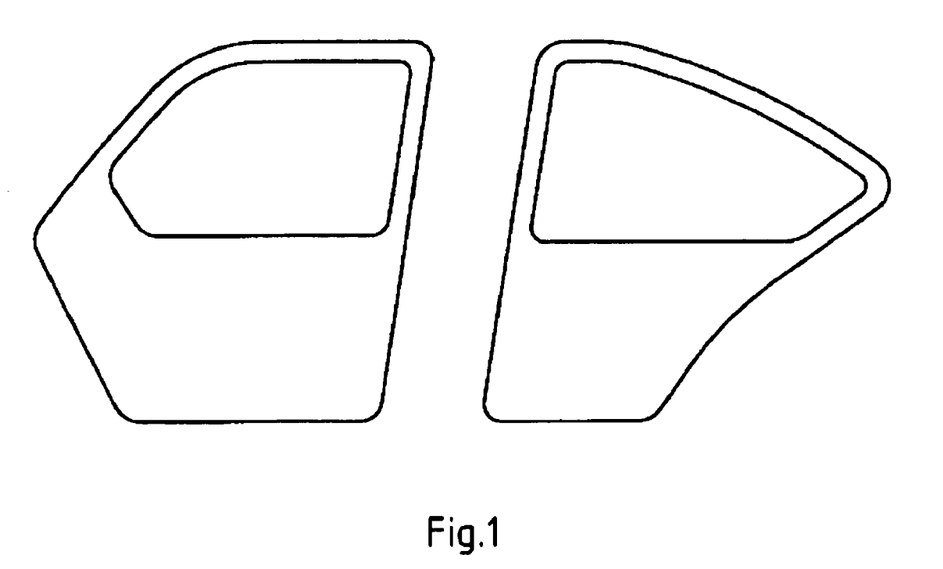
FIG. 1 shows contours of two components having a similar shape, a front and a rear door of a vehicle body adjacent to each other.
Figure 2:
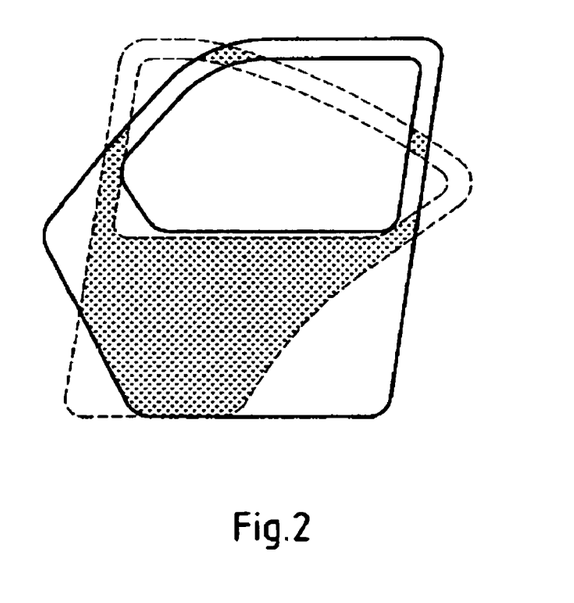
FIG. 2 shows the contours of the components having a similar shape of FIG. 1 one above the other.

FIG. 1 on the left illustrates the contour of a first component, a front door of a motor vehicle, and on the right the contour of a similarly-shaped second component, to be precise the rear door. In FIG. 2 the two contours are drawn one above the other. In this illustration the congruent areas are illustrated as dotted lines. These congruent areas are also suitable for gripping the component with one and the same clamp device.

Figure 3:
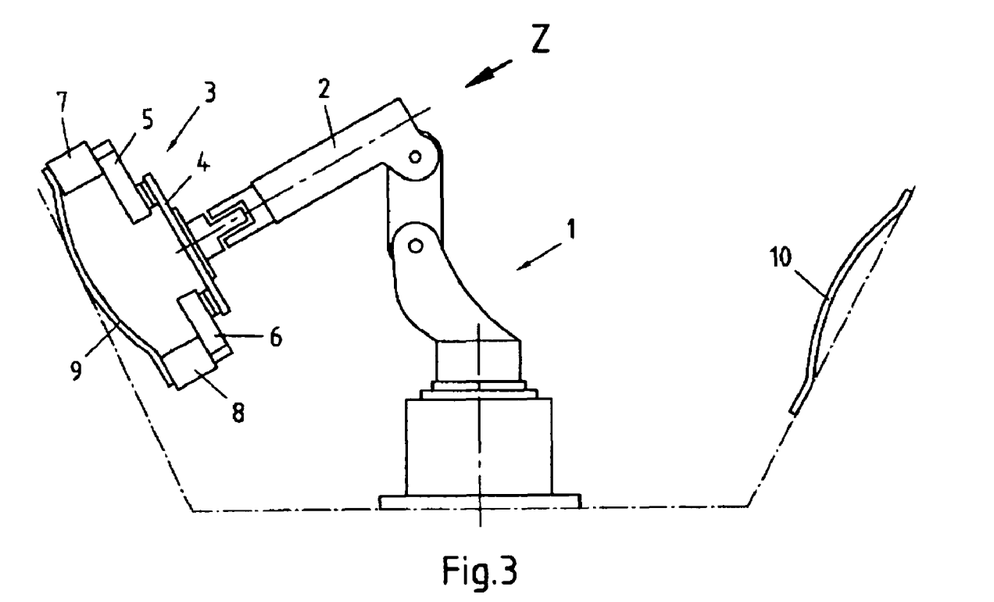
FIG. 3 shows a handling system with a gripper in side view.
Figure 4:
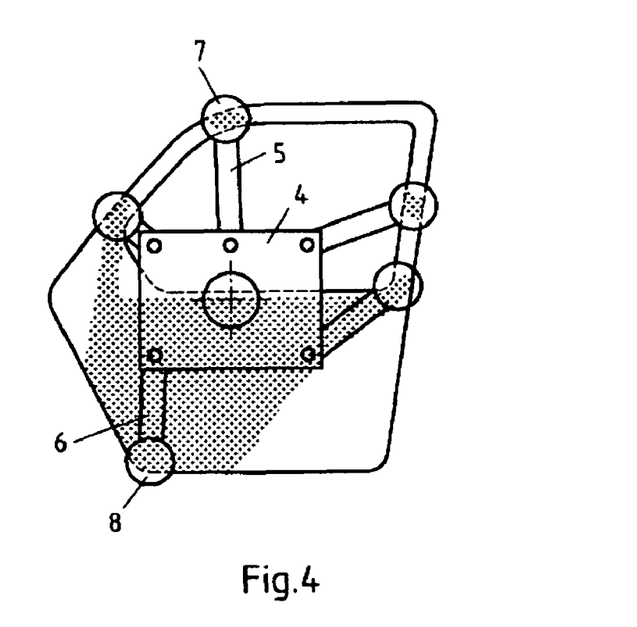
FIG. 4 shows the gripper of the handling system viewed in the direction of arrow Z of FIG. 3 with several clamp devices adjusted to the congruent contours of the front and rear door.
Figure 5:
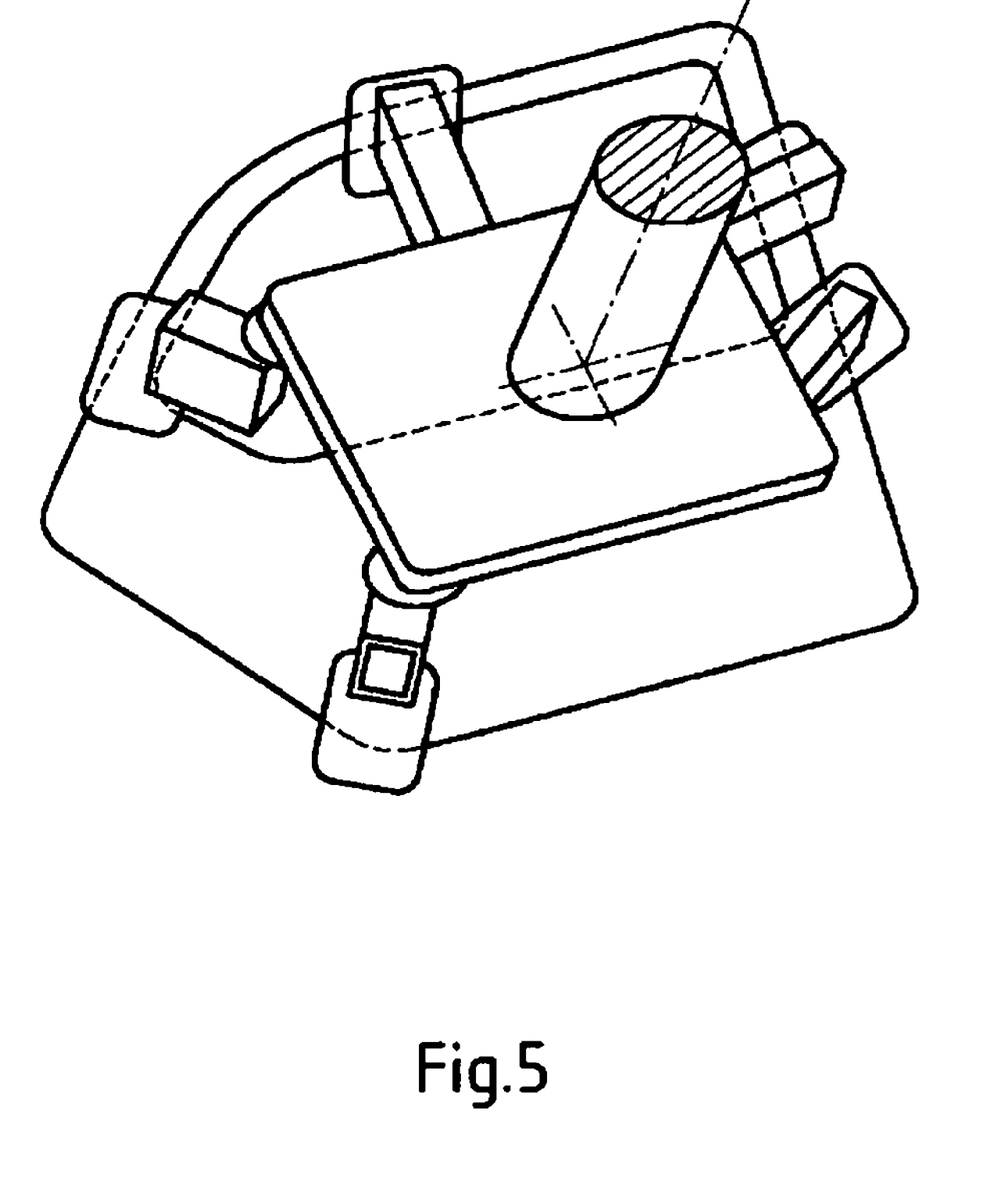
FIG. 5 shows the gripper of FIGS. 3 and 4 in perspective illustration.

The handling system illustrated in FIG. 3 has a robot 1, which carries a gripper 3 on its arm 2. This gripper 3 can be moved by the robot 1 in the space about a plurality of axes. The gripper 3 has a base 4 with arms 5, 6 arranged pivotally thereon and adapted in length, which at their end carry a clamp device 7, 8 in each case. The clamp devices 7, 8 are, according to FIG. 4, positioned on the congruent areas of the similarly-shaped components to be handled, again marked as a dotted line. With this positioning it is possible to grip the front door 9 illustrated in FIG. 3 on the left, but also the rear door 10 illustrated on the right, although the rear door 10, also within the congruent areas, has a different height to the front door 9. Compensation for the different height and contour of the components within the areas to be gripped is made by special contour pieces. In this case the gripper 3 can grip the components both from their concave side (component 9) and also from their convex side (component 10).

Figure 6:
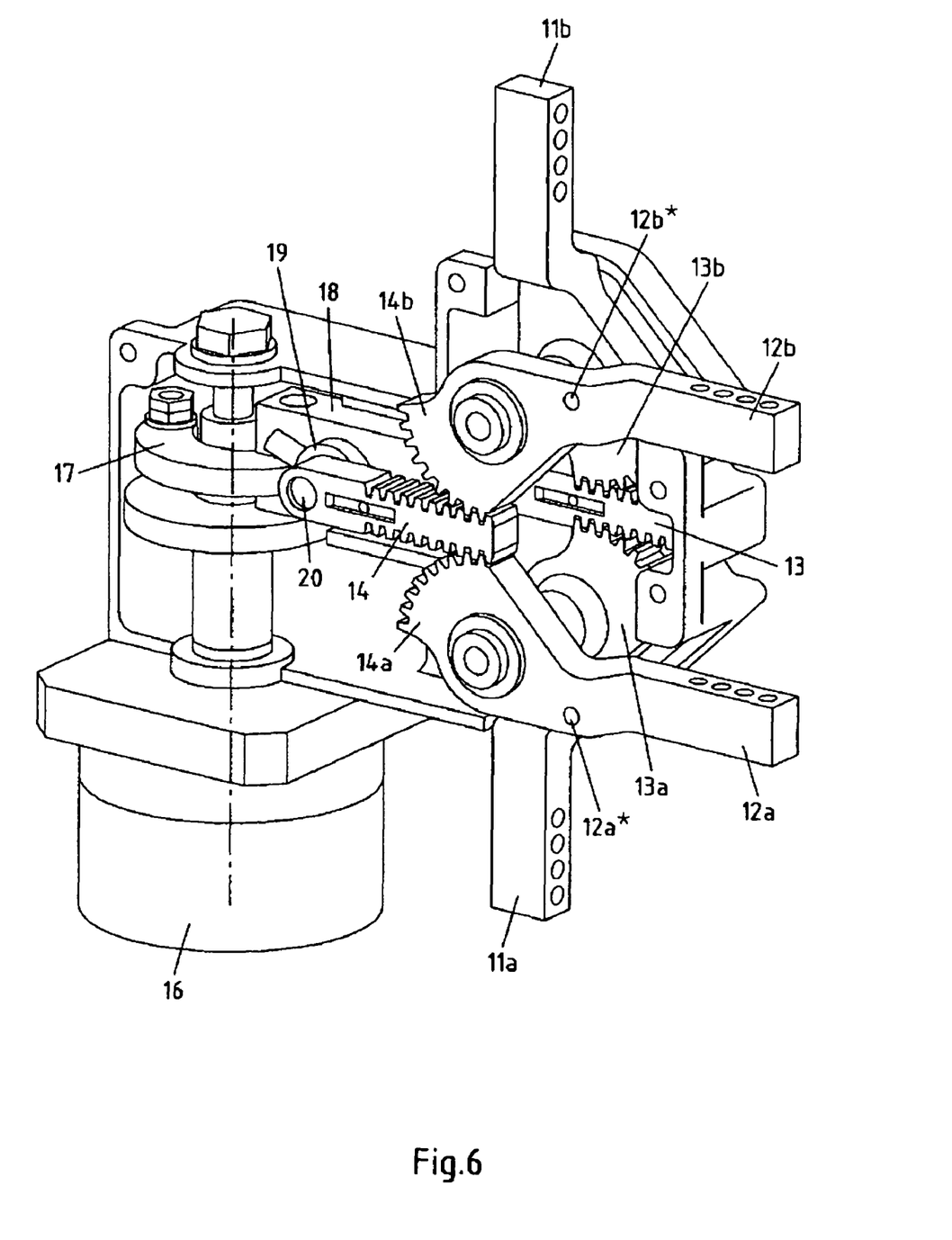
FIG. 6 shows one of the clamp devices of the gripper according to FIG. 3 in its structural make-up, in perspective illustration, whereby one half of its clamshell housing is removed.

All clamp devices 7, 8 of the gripper 3 have the same structure. As FIG. 6 shows, each clamp device 7, 8 has two gripper chucks 11, 12 with gripper jaws 11a, 11b, 12a, 12b which in each case pivot around 90°. These gripper jaws 11a to 12b can be expanded with contour pieces (not illustrated), which are adapted to the contour of the component to be gripped. The pair of gripper jaws 11a, 11b for example are provided for the component A, e.g. the front door 9, while the other pair of gripper jaws 12a, 12b are provided for the component B, e.g. the rear door 10. While the pair of gripper jaws 12a, 12b are located in the grab position, the pair of gripper jaws 11a, 11b are in the parking position, where they are held by locking means, for example a ball catch consisting of a spring-tensioned ball in the housing and a recess in the gripper jaws 11a, 11b. In FIGS. 6 and 8 these recesses 12a* and 12b* are only visible for the gripper jaws 12a, 12b. Other locking means of a pneumatic, hydraulic, electromagnetic type or combinations thereof are possible. A toothed push bar 13, 14, which combs with toothed segments 14a, 14b, 15a, 15b of the pivoting gripper jaws 11a, 11b, 11b, 12a, 12b, serves to pivot the two pairs of gripper jaws 11a, 11b, 12a, 12b around 90° in each case. The two toothed push bars 13, 14 are driven by a common drive, which consists of a rotary cylinder 16 and a rotational part 17. In order to couple the two toothed push bars 13, 14 alternately to the crank and rocker linkage mechanism 17, an engaging piece 18 illustrated in FIGS. 7 and 8 coupled to the crank of the crank and rocker linkage mechanism 17, with a controllable clutch element 19, formed as cylinder piston arrangement, which can be impacted on both sides by a pressurizing medium, is arranged between the two toothed push bars 13, 14. The controllable clutch element 19, with journals 20 of its piston 21, enables either the toothed push bar 13 or the toothed push bar 14 to be coupled to the crank of the crank and rocker linkage mechanism 17. Since in respect to the clamp device 7, 8 it can be ensured that whenever the gripper jaws 12a, 12b are in the grab position, the gripper jaws 11a, 11b are located in the parking position and thus do not lie in their path of movement, the component can be gripped without problem. If the other component is to be gripped, the gripper jaws 12a, 12b are pivoted back by 90° into the parking position, while the gripper jaws 11a, 11b are pivoted into the grab position. This means that with one and the same clamp device 7, 8 components having a similar shape can be gripped on the congruent areas, without the gripper jaws provided for the one component obstructing the gripping of the other component by the other gripper jaws and vice versa.

Figure 7:
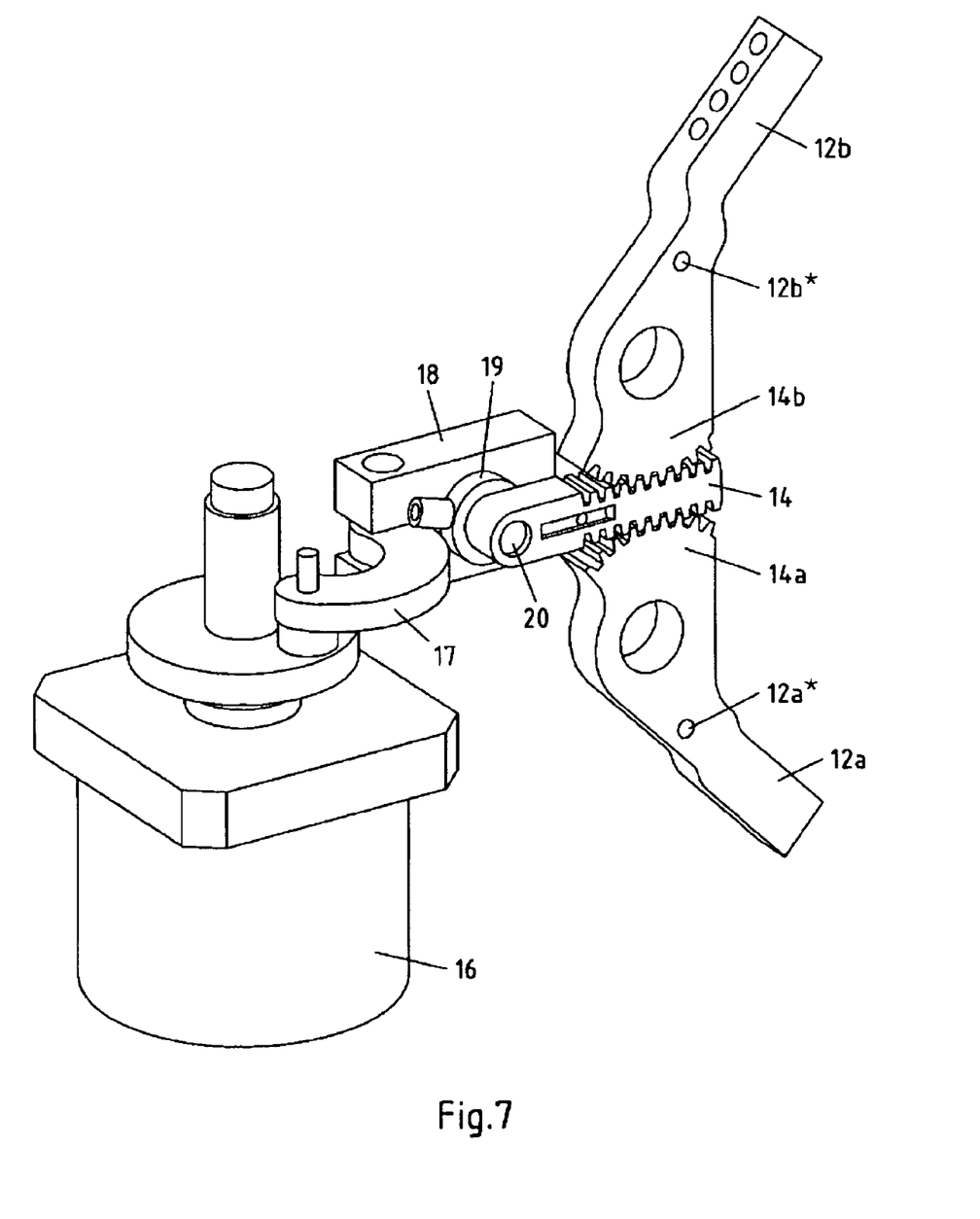
FIG. 7 shows a detail of the clamp device of FIG. 6, and to be precise a gripper chuck with its drive, in perspective illustration.
Figure 8:
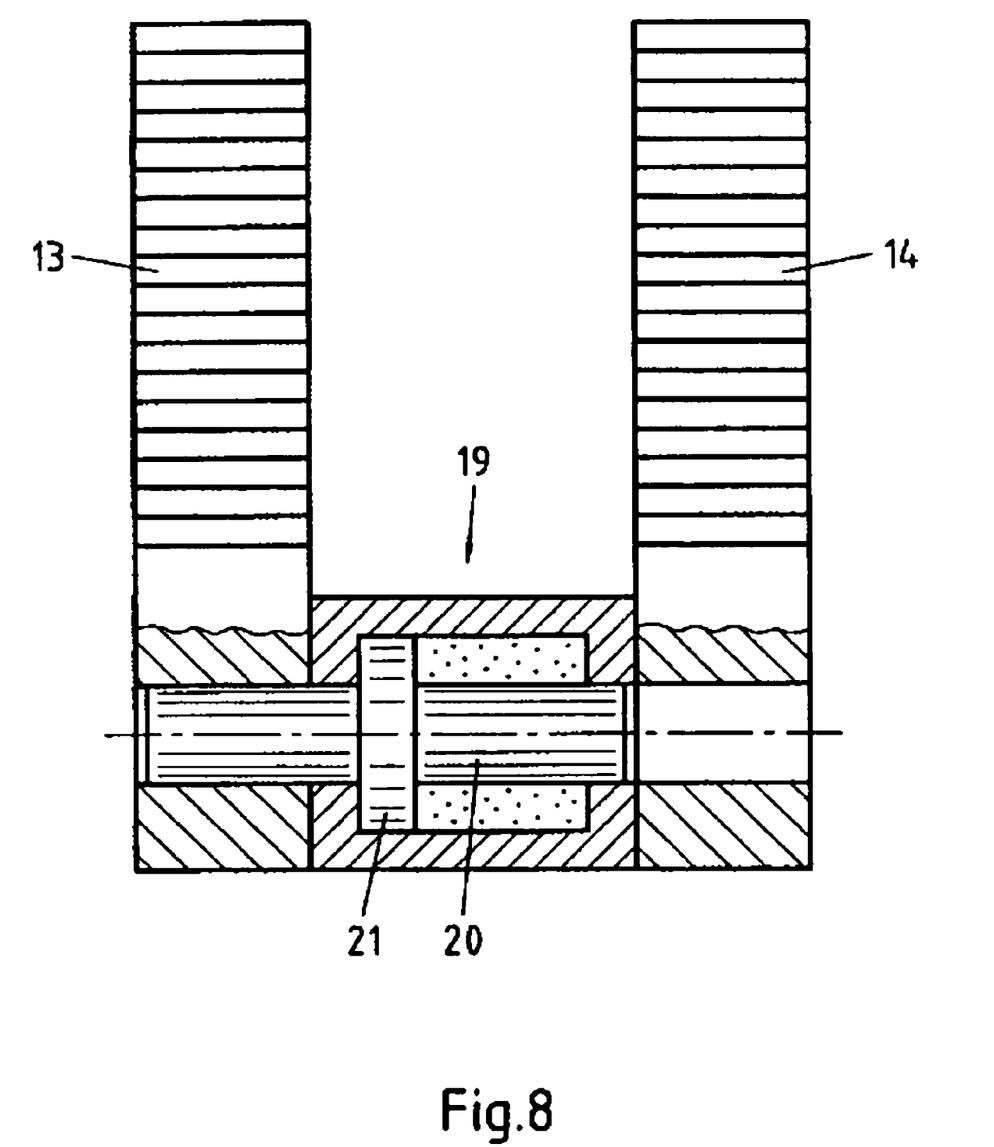
FIG. 8 shows a detail of the gripper chuck of FIG. 7 in schematically simplified illustration.
Figure 9:
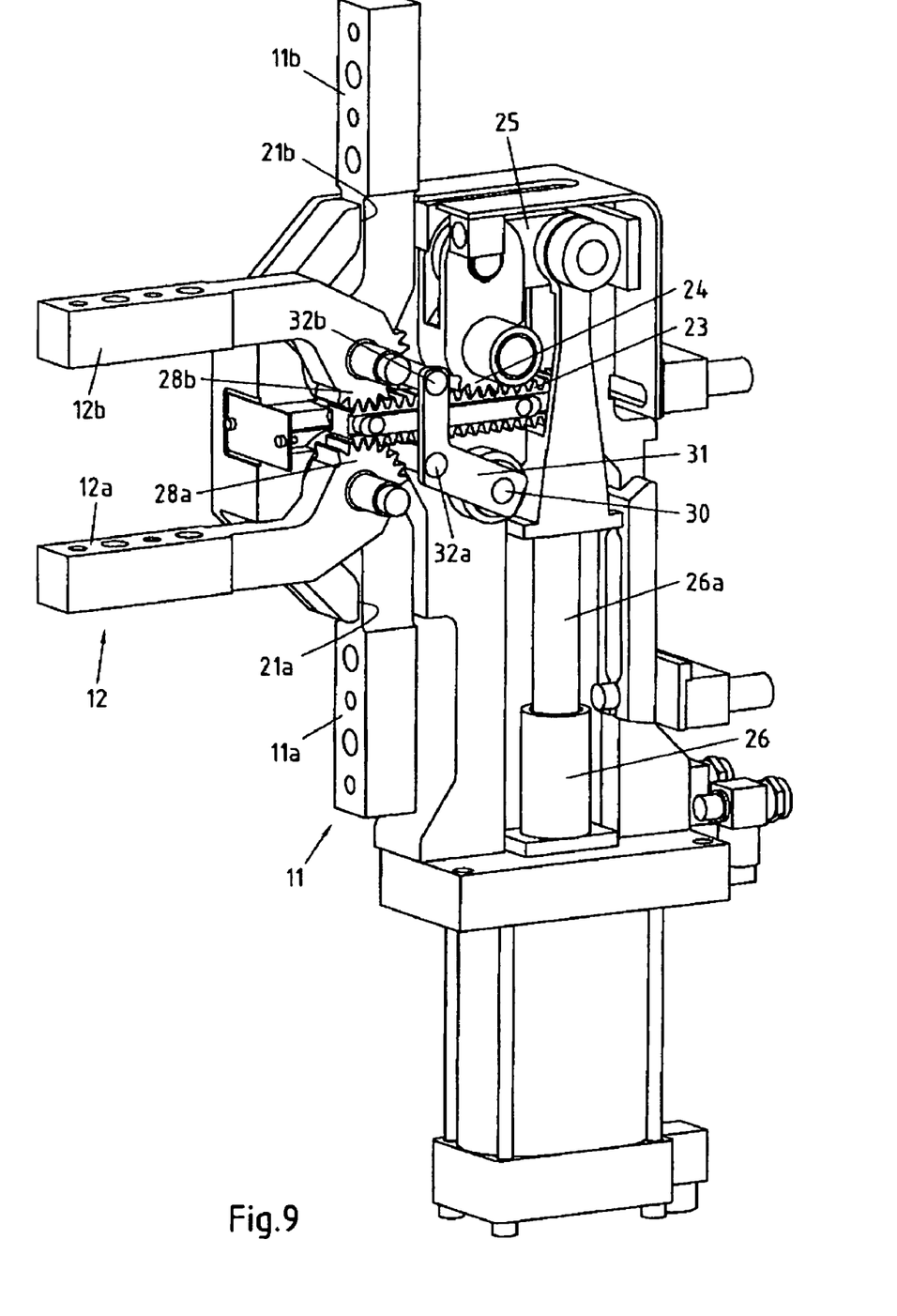
FIG. 9 shows one of the clamp devices of FIG. 3 in an embodiment, alternative to FIGS. 6 to 8, in perspective illustration, whereby one side of its clamshell housing is removed.
Figure 10:
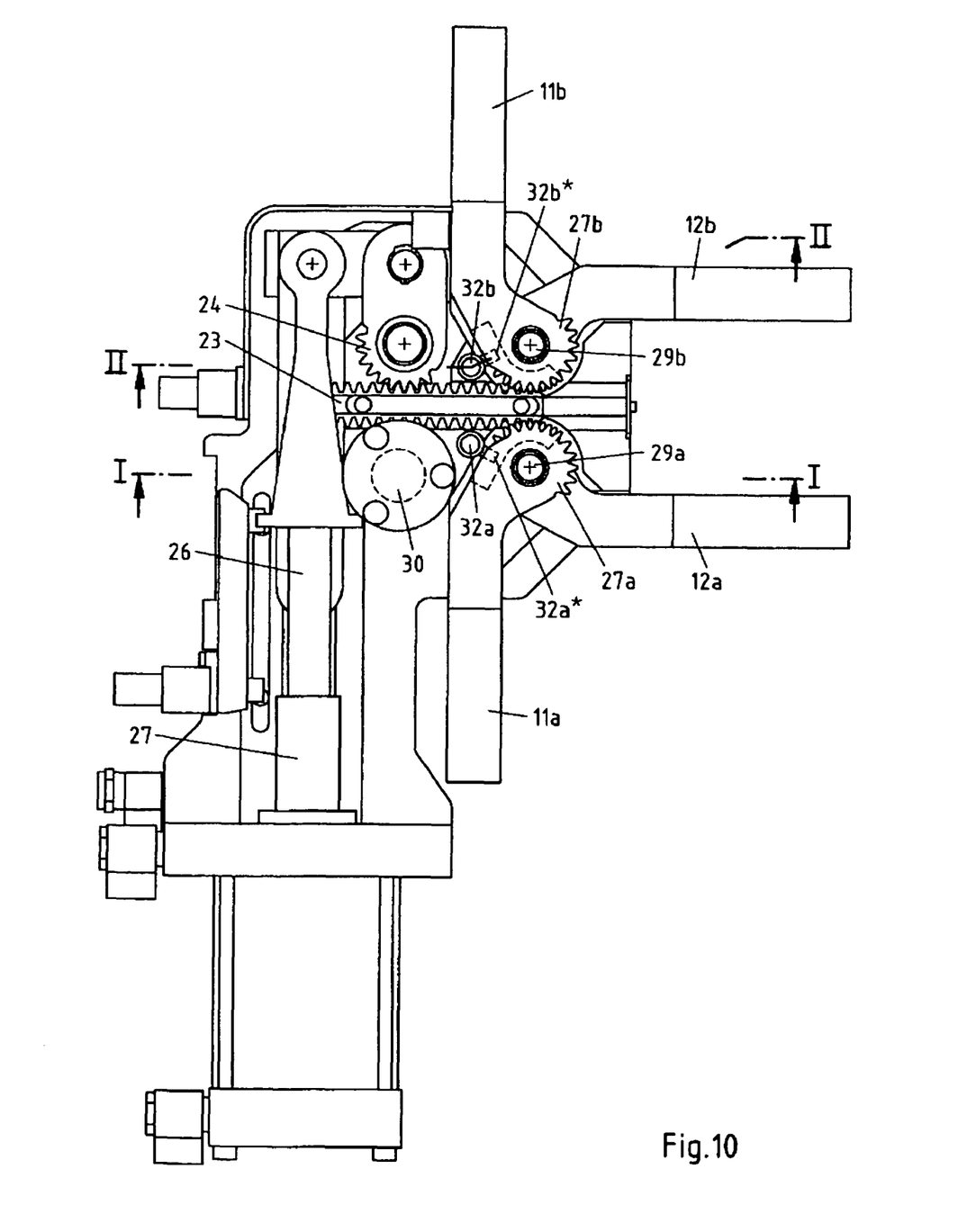
FIG. 10 shows the clamp device in accordance with FIG. 9 in side view.
Figure 11:
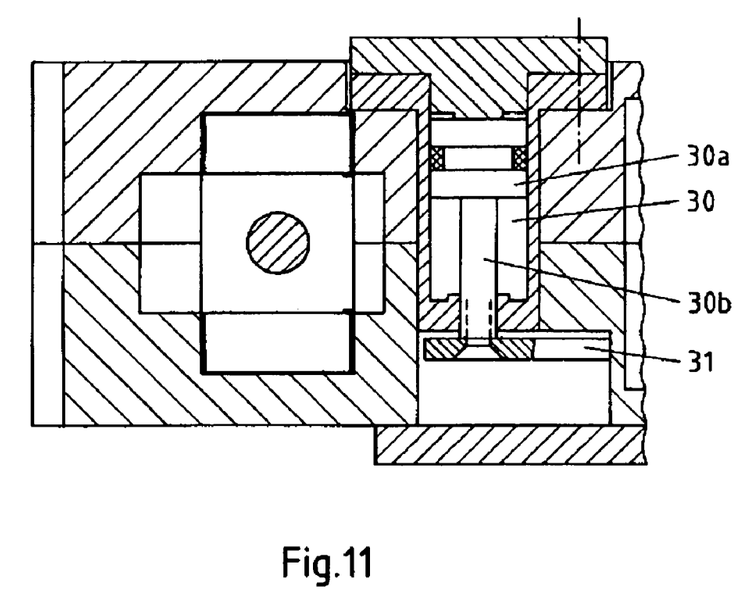
FIG. 11 shows the clamp device in accordance with FIG. 10 in partial section along line I-I.
Figure 12:
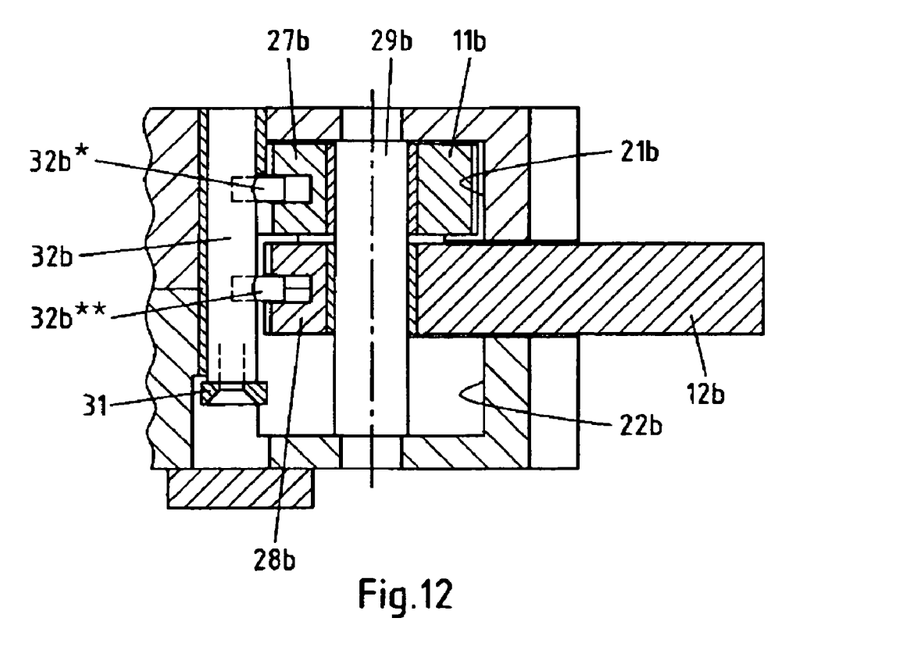
FIG. 12 shows the clamp device in accordance with FIG. 10 in partial section along line II-II of FIG. 10.

As is the case for the exemplary embodiment of FIGS. 6 to 8 first described, all clamp devices 7, 8 of the gripper 3 have the same structure also in the case of the second exemplary embodiment of FIGS. 9 to 12. However the drive of their gripper jaws 11a, 11b, 12a, 12b and their locking device in the parking position are different. While the pair of gripper jaws 12a, 12b are in the grab position, the pair of gripper jaws 11a, 11b are in the parking position, where in the case of the second exemplary embodiment they are held by lateral holding pockets 21a, 21b, 22b.

For pivoting the gripper jaws 11a, 11b, 12a, 12b of each gripper chuck 11, 12 a toothed push bar 23, with teeth on both sides, is propulsively connected to a piston rod 26a of a cylinder piston arrangement 26 via a pinion 24 and an elbow lever 25, coupled thereto. This toothed push bar 23 serves to drive the gripper jaws 11a, 11b, 12a, 12b of both gripper chucks 11, 12. Different from the main patent, the gripper chucks 11, 12 can be moved to alternately engage with the toothed push bar 23 via the drive pinions 27a, 27b, 28a, 28b of their gripper jaws 11a, 11b, to 12a, 12b. For this purpose the gripper jaws 11a, 11b, 12a, 12b, pivotally mounted on their bearing journals 29a, 29b can also be axially displaced on these bearing journals 29a, 29b. A pneumatic drive, which has a cylinder piston arrangement 30 with a piston 30a, able to be impacted on both sides by a pressurizing medium, and a piston rod 30b, which is coupled via a crosshead 31 to two axially displaceable journals 32a, 32b is provided for the common axial displacement of the gripper jaws 11a, 11b, 12a, 12b. Each journal 32a, 32b has two pins **32b\*, 32b\*\*, 32a\* acting as engaging pieces, which engage in annular grooves of the drive pinions 27a, 27b, 28a of the gripper jaws 11a, 11b, 12a, 12b**.

The gripper jaws 11a, 11b, 12a, 12b are changed over in the following way: all gripper jaws 11a, 11b, 12a, 12b are in the open position. In this position the pair of gripper jaws 11a, 11b located in the holding pockets 21a, 21b in the lateral parking position can be moved into the central position, the operating position, while the other pair of gripper jaws 12a, 12b are transferred into the other lateral holding pockets 21a, 22b in the parking position and can be securely held here. During this change-over the first pair of gripper jaws 11a, 11b with their drive pinions 27a, 27b are moved to engage with the toothed push bar 23, while the other pair of gripper jaws 12a, 12b with their drive pinions 28a, 28b are disengaged from the toothed push bar 23. The pair of gripper jaws 11a, 11b moved thus into the central middle position, namely in the operating position, can now be pivoted by the toothed push bar 23, being laterally guided through guide flanks formed by the housing, while the other pair of gripper jaws 12a, 12b are positively held in the associated holding pockets 22b.

The invention claimed is:

1. Handling system for components having a similar shape, that are congruent in several places but have a different height relative to each other, the system comprising:
    an arm of a robot; and
    a gripper on the arm of the robot,
    wherein the gripper is equipped with several clamp devices having contour pieces adapted to the components, with which the respective component can be gripped on areas, which are spatially staggered to one another, wherein each clamp device comprises two gripper chucks, each with gripper jaws that can be pivoted from a parking position into a grab position, wherein the parking position is a position in which one of the gripper chucks is outside of a grab movement of the other of the gripper chucks, wherein when the gripper jaws of the one of the gripper chucks are held in the parking position the gripper jaws of the other of the gripper chucks are pivoted into the grab position and when the gripper jaws of the other of the gripper chucks are held in the parking position the gripper jaws of the one of the gripper chucks are pivoted into the grab position, and wherein the gripper jaws are coupled to a common displacement drive.

2. Handling system according to claim 1, wherein the clamp devices are held by support arms.

3. Handling system according to claim 1 wherein the gripper chucks of each clamp device have a drive comprising toothed push bars in each case.

4. Handling system according to claim 3, wherein the toothed push bars of two gripper chucks, arranged adjacent to each other, of the same clamp device, can be alternately coupled to an engaging piece of the drive.

5. Handling system according to claim 4, wherein the engaging piece is a constituent of a rotational part.

6. Handling system according to claim 1, wherein the gripper jaws of the two gripper chucks can be pivotally and axially displaced on common bearing journals and, with drive pinions, can be alternately coupled to a common driven toothed push bar.

7. Handling system according to claim 6, wherein the displacement drive has an actuator displaceably mounted parallel to the bearing journal and driven by a servo motor, which is connected to the gripper jaws via engaging pieces.

8. Handling system according to claim 7, wherein the servo motor is a cylinder piston arrangement, able to be impacted on both sides with pressurizing medium and to whose piston rod the actuator is attached.

9. Handling system according to claim 7, wherein the engaging pieces are pins, which engage in coaxial annular grooves of the drive pinions.

10. Handling system according to claim 6, wherein guide flanks are provided on both sides for the gripper jaws of each active gripper chuck, whose drive pinion now exactly engages with the toothed push bar, said guide flanks being effective during the pivot movement of said gripper jaws, and in that a lateral holding pocket is provided for the gripper jaws of each then inactive gripper chuck, whose drive pinion does not then engage with the toothed push bar.

11. Handling system according to claim 6, wherein the toothed push bar is propulsively connected to a piston rod of a cylinder piston arrangement via a pinion and an elbow lever coupled thereto.

* * * * *